US006974262B1

(12) United States Patent
Rickenbach

(10) Patent No.: US 6,974,262 B1
(45) Date of Patent: Dec. 13, 2005

(54) COMMUNICATION CABLE

(76) Inventor: Robert Rickenbach, 1068 Calle Rey, Thousand Oaks, CA (US) 91360

( * ) Notice: Subject to any disclaimer, the term of this patent is extended or adjusted under 35 U.S.C. 154(b) by 0 days.

(21) Appl. No.: 10/762,636

(22) Filed: Jan. 21, 2004

(51) Int. Cl.[7] .................................................. G02B 6/36
(52) U.S. Cl. ........................................... 385/88; 385/53
(58) Field of Search ............................. 385/75, 76, 77, 385/88; 398/135–139, 140–172

(56) References Cited

U.S. PATENT DOCUMENTS

| | | | | |
|---|---|---|---|---|
| 4,158,478 | A | 6/1979 | D'Auria et al. | |
| 4,497,537 | A | 2/1985 | Dench | |
| 4,691,386 | A * | 9/1987 | Eumurian et al. | 398/139 |
| 4,695,127 | A | 9/1987 | Ohlhaber et al. | |
| 4,767,181 | A | 8/1988 | McEowen | |
| 4,787,701 | A * | 11/1988 | Stenger et al. | 385/70 |
| 4,787,705 | A | 11/1988 | Shinmoto et al. | |
| 4,852,965 | A | 8/1989 | Mullin et al. | |
| 5,039,197 | A | 8/1991 | Rawlyk | |
| 5,064,299 | A * | 11/1991 | Hirschmann et al. | 385/33 |
| 5,140,659 | A | 8/1992 | Minds et al. | |
| 5,268,971 | A | 12/1993 | Nilsson et al. | |
| 5,280,554 | A | 1/1994 | Gleim et al. | |
| 5,574,815 | A | 11/1996 | Kneeland | |
| 5,696,861 | A | 12/1997 | Schimmeyer et al. | |
| 5,967,840 | A | 10/1999 | Rose et al. | |
| 6,169,834 | B1 | 1/2001 | Keller | |
| 6,256,121 | B1 * | 7/2001 | Lizotte et al. | 359/15 |
| 6,350,063 | B1 * | 2/2002 | Gilliland et al. | 385/88 |
| 6,416,334 | B1 | 7/2002 | Plishner | |
| 6,434,308 | B1 * | 8/2002 | Trezza | 385/119 |
| 6,533,466 | B1 | 3/2003 | Smith | |

* cited by examiner

*Primary Examiner*—Jennifer Doan
(74) *Attorney, Agent, or Firm*—Jack C. Munro

(57) ABSTRACT

A communication cable which takes the form of an elongated flexible conductor which has mounted at one end thereof a transmitting connector and at the opposite end thereof a receiving connector. The conductor has integratingly mounted therein a plurality of optical fibers and a plurality of electrical wires. The transmitting connector includes a light emitting device for each optical fiber and a flexible printed circuit board holding electronic circuitry for converting electrical signals into optical signals. Further, the transmitting connector has an electrical interface accessible by the user. The receiving connector includes a photodetector for each optical fiber and also a flexible printed circuit board holding electronic circuitry for converting optical signals back to electrical signals. The receiving connector also has an electrical interface accessible by the user.

12 Claims, 2 Drawing Sheets

10
12
14
26
30
32
34
62
74

COMMUNICATION CABLE

BACKGROUND OF THE INVENTION

1. Field of the Invention

This invention relates to a communication cable and more specifically to a communication cable which is constructed to include both electrical wires and optical fibers.

2. Description of the Related Art

In the operation of machines that are computer controlled, there is required a communication cable. The communication cable would extend between the machine and the computer. Typical machines or pieces of equipment would be metal forming machines or any machine whose operation is controlled by computer.

It is common that the computer is spaced some distance from the machine. To connect the machine to the computer a cable is required. Normally, in a place of business, there will be several machines. Each of these machines produce electromagnetic interference (EMI) or radio frequency interference (RFI). There also can be produced ground loops and ground currents. The typical cable that interconnects the machine to the computer basically contains just electrical wires. The transmission of the electrical signals over these electrical wires can be interfered with by the EMI, RFI, ground loops and or ground currents. This interference can result in incorrect control signals being supplied from the machine to the computer or vice versa. In the past, this problem, though relatively common, has been just lived with as there has not been any known structure that has been available to correct the problem. Extensive shielding, extra heavy ground wires and in general keeping cables short allowed the systems to work. In some cases marginally.

One way in which to avoid this kind of interference with electrical wires is to eliminate the electrical wires so that the control signals are not transmitted along electrical wires. One way this could be done is by using of fiberoptics. However, in the past, fiberoptic cables were relatively mechanically sensitive and frequently installations could be somewhat abusive. The result was the fiberoptic cable broke or deteriorated to where it was inoperative. The fiberoptics only needs to be used in conjunction with the control signals. The power that is transmitted between the computer and the machine can be transmitted by electrically conducting metallic wires as the power transmitting wires are sensitive to the EMI and RFI.

There is a need to construct a cable which includes not only electrical wires for transmitting of power but also fiberoptics for transmitting of control signals. The cable must be constructed to withstand abuse, and because it looks and functions just like a regular electrical cable, the user can be completely unknowledgable of the fact that it is a fiberoptic cable. The use of such a cable would be extremely critical and desirable in sensitive applications thereby completely avoiding any kind of electronic or electrical interference to the control signal.

SUMMARY OF THE INVENTION

A first embodiment of communication cable of this invention includes a transmitting connector and a receiving connector. In between the transmitting connector and the receiving connector is located an elongated, flexible conductor. Included within that conductor is a fiberoptic assembly of at least one optical fiber and a wire assembly of at least one metallic wire. The wire is to conduct electrical power and the fiber is to conduct light pulses. The transmitting conductor includes a light emitting diode or laser diode connected to the fiber. The light emitting diode is to receive an electrical signal and then convert such into a corresponding light signal which is transmitted through the fiber to be reconverted back to an electrical signal at the receiving connector.

A further embodiment of the present invention is where the first basic embodiment is modified by there being included within the transmitting connector a first flexible printed circuit board and within the receiving connector a second flexible printed circuit board.

A further embodiment of the present invention is where the first basic embodiment is modified by the wire assembly comprising a plurality of spaced apart wires and the fiber assembly comprises a plurality of spaced apart optical fibers.

A further embodiment of the present invention is where the first basic embodiment is modified by the optical fibers being fixedly mounted within both the transmitting connector and the receiving connector.

A second basic embodiment of the present invention is directed to a connector for a communication cable which comprises a housing with a light pulse receiver being mounted within the housing. The light pulse receiver is connected to a flexible printed circuit board. The printed circuit board is also mounted within the housing. A light source is connected to the housing with the light source to supply a light pulse to the light pulse receiver. An electrical signal output connector is connected to the printed circuit board with the electrical signal output connector adapted to receive an electrical signal from the printed circuit board and transmit same to an external machine.

A further embodiment of the present invention is where the second basic embodiment is modified by the light source being defined as a flexible cable.

A further embodiment of the present invention is where the just previous embodiment is modified by the cable being defined as including a plurality of separate optical fibers and also a plurality of separate electrical conducting wires.

A further embodiment of the present invention is where the second basic embodiment is modified by the cable being fixedly mounted to the housing so the light source is not capable of any movement relative to the cable which would result in non-transmission of the light pulse.

A third basic embodiment of the present invention is directed to a connector for a communication cable which comprises a housing with there being included within the housing a light pulse emitter. The light pulse emitter is connected to a flexible printed circuit board. The flexible printed circuit board is also mounted within the housing. A light pulse receiver is connected to the housing with the light pulse receiver to receive a light pulse from the light pulse emitter and transmit same to an output path located exteriorly of the housing.

A further embodiment of the present invention is where the third basic embodiment is modified by the output path being defined as a flexible conductor.

A further embodiment of the present invention is where the just previous embodiment is modified by the conductor being defined as being formed of a plurality of spaced apart optical fibers and a plurality of spaced apart electrical connecting wires.

A further embodiment of the present invention is where the third basic embodiment is modified by the optical fibers being fixedly mounted to the housing so the light pulse emitter is not capable of any movement relative to the housing.

A fourth basic embodiment of the present invention is directed to a method of communicating between a computer and a machine comprising the step of installing between the computer and the machine a communication cable that has both electrical wires for power transmission and optical fibers for transmitting of control signals.

A further embodiment of the present invention is where the fourth basic embodiment is modified by prior to the installing step there is the additional step of constructing the cable so the optical fibers are fixed in position within end connectors.

A further embodiment of the present invention is where the just previous embodiment is modified by installing within the end connectors a flexible printed circuit board.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figures 1, 2, 3:
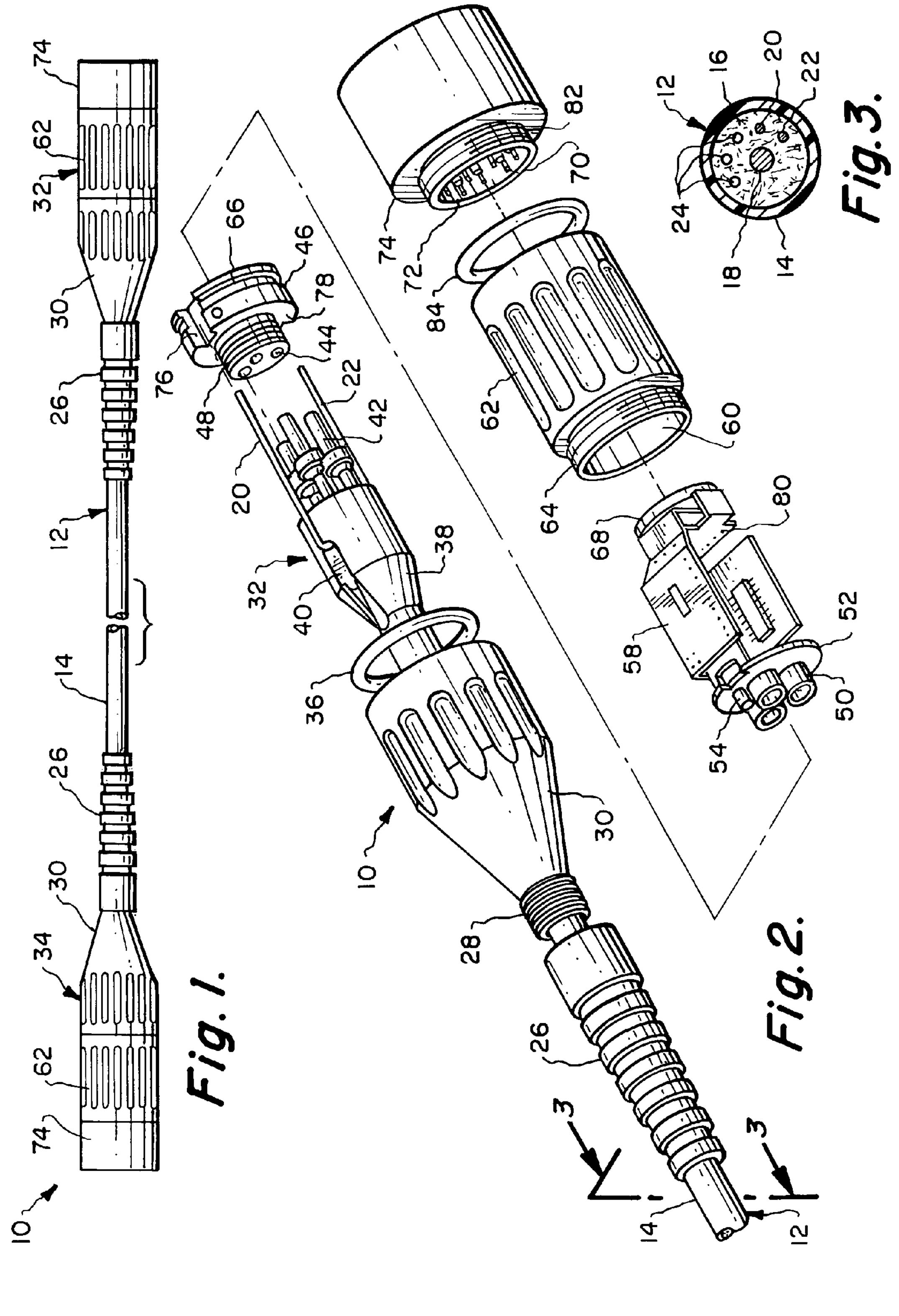
FIG. 1 is an exterior, longitudinal, side elevational view of the communication cable constructed in accordance with this invention with the cable being broken so as to indicate that the cable could be constructed of any desirable length.
FIG. 2 is an exploded isometric view showing the construction of the internal components within the end connectors that comprise the transmitting connector and the receiving connector that is included at opposite ends of the communication cable of the present invention.
FIG. 3 is a transverse cross-sectional view through the elongated, flexible conductor of the communication cable of the present invention taken along line 3—3 of FIG. 2.

Referring particularly to the drawings, there is shown in FIGS. 1–3 the communication cable 10 of this invention. Communication cable 10 is formed of an elongated flexible conductor 12 which can be any desired length, normally from a few feet to thirty, forty, fifty feet or more in length. The conductor 12 is basically cylindrical, however any desired shape could be utilized. Conductor 12 is formed of an outer cover 14 which is in the shape of a tube which has an internal chamber 16. The cover 14 will normally be constructed of a plastic, rubber or other similar type of insulating material.

Centrally located within the internal chamber 16 is a strength member 18. The strength member 18 will normally be constructed of any material that has a high tensile strength. Typical desirable materials would be steel, carbon fiber or a material that is sold under the trademark of Kevlar. Whatever material that is selected for the strength member 18, it is the primary requirement that the strength member 18 not be stretchable but will remain in its established length. The length of the strength member 18 will extend the entire length of the conductor 12. Also contained within the internal chamber 16 are at least one pair of spaced-apart metallic wires 20 and 22 and three in number of optical fibers 24. However, it is considered to be within the scope of this invention that there could be more optical fibers 24 or even fewer in number of optical fibers 24. Also, in all probability there will be a greater number of the wires 20 and 22. The wires 20 and 22 will commonly be constructed of copper. The optical fibers 24 would generally be constructed of a glass. The wires 20 and 22 are used for conducting of electrical power and non-critical electrical signals. The optical fibers 24 are to be used for the conducting of control signals.

Mounted about the conductor 14 directly adjacent each end thereof is a strain relief and moisture seal boot 26. Normally this boot 26 will be constructed of a plastic or rubber material. The boot 26 is to be telescopingly mounted or otherwise attached on narrow end 28 of a backshell 30. The back shell 30 is a housing cover. The backshell 30 is part of a transmitting connector 32 at one end of the conductor 12 and also at the opposite end of the conductor 12 is part of a receiving connector 34. As will be explained further on in the specification, there is a very minor difference in the construction between the connectors 32 and 34 so it is to be understood that the explanation, as far as the constructional features of the connectors 32 and 34, will apply to both connectors 32 and 34.

The backshell 30 has an internal chamber which is not shown. Confiningly located within this internal chamber is an O-ring seal 36. Also located within this internal chamber of the backshell 30 is a jacket 38. The jacket 38 will be fixedly connected to the conductor 12, usually by crimping. It is important that the physical attachment between the jacket 38 and the cable 12 to be such as to establish a physical connection with the strength member 18. The jacket 38 includes a pair of longitudinal slots 40 with only one such slot 40 being shown. The slots 40 are diametrically located apart relative to the jacket 38. The jacket 38 is basically cylindrical in configuration forming a narrow cylinder at its outer end and an enlarged cylinder at its inner end which are separated by an annular tapered section.

Each, optical fiber 24 is mounted within a ferrule 42, with it being understood that there are three in number of the ferrules 42, one for each optical fiber 24. Each ferrule 42 is then mounted within a hole 44 formed within an adapter 46. The adapter 46 includes an externally knurled section 48 which is to crimping connect within the internal chamber of the jacket 32. The ferrules 42 are precisely positioned within the adapter 46 so the outer end of each ferrule 42 will be located directly against the photodiode or LED 50. The three in number of photodiodes/LED 50 are fixedly mounted onto a printed circuit board (PCB) 52. Two pins 54 will engage within a hole, not shown, which is formed within the adapter 46 so the screws 54 functions as a position locator when mounting the photodiodes/LED 50 relative to the ferrules 42.

The transmitting connector 32 will include light emitting diodes. The receiving connector 34 will include photodiodes. The photodiodes receive light which is then used to produce an electrical signal. Light emitting diodes produce light from an electrical signal. The printed circuit board 52 is connected to a flexible printed circuit board 58 which is basically U-shaped in configuration. Mounted on the printed circuit board 58 are a mass of electronic components which are necessary to transform the electrical signals into light pulses in the transmitting connector 32, or to change the light pulses from the optical fibers 24 to an electrical signal in the receiving connector 34. The reason the printed circuit board 58 is made flexible is so that it can readily fold and fit within the confines of an internal chamber 60 formed within an adaptor housing 62. The adaptor housing 62 has a threaded section 64 that is to threadingly engage with an internally threaded section formed within the backshell 30 forming basically an airtight and watertight connection therebetween. The wall surface of the internal chamber 60 abuts against the O-ring seal 36 which rests within the annular groove 66 of the adapter 46.

The disc 52 is mounted on one side of the printed circuit board 58 with a female pin connection member 68 being mounted on the opposite side of the printed circuit board 58. This female pin connection member 68 is to connect with pins 70 that are mounted within internal chamber 72 which is formed within a connector housing 74. The connector housing 74 will be connected to an optical encoder mounted to a machine, which is not shown. The machine could be any machine that is operated by the use of a computer or programmable logic controller, which is again not shown. The receiving connector 34 will be connected to a computer, which is again not shown.

Wire 20 is conducted out through a slot 40 and then longitudinally through a longitudinal groove 76 formed within the exterior surface of the adaptor 46. In the same manner, the wire 22 is conducted through the diametrically opposite slot 40 and then longitudinally through a groove 78 formed within the exterior surface of adaptor 46. The grooves 76 and 78 are diametrically located opposite each other. The wires 20 and 22 are then mounted each within a hole 80 formed within the female pin connection member 68. The result is that the electrical power between connectors 32 and 34 is connected by the wires 20 and 22 completely separate from the optical fibers 24. Control signals that are conducted between the connectors 32 and 34 are transmitted solely through the optical fibers 24 between the connectors 32 and 34.

The connector housing 74 has a threaded section 82 about which is to be located an O-ring seal 84. The threaded section 82 is to threadingly engage within the adapter housing 62 by means of a set of female threads, which are not shown.

Figure 4:
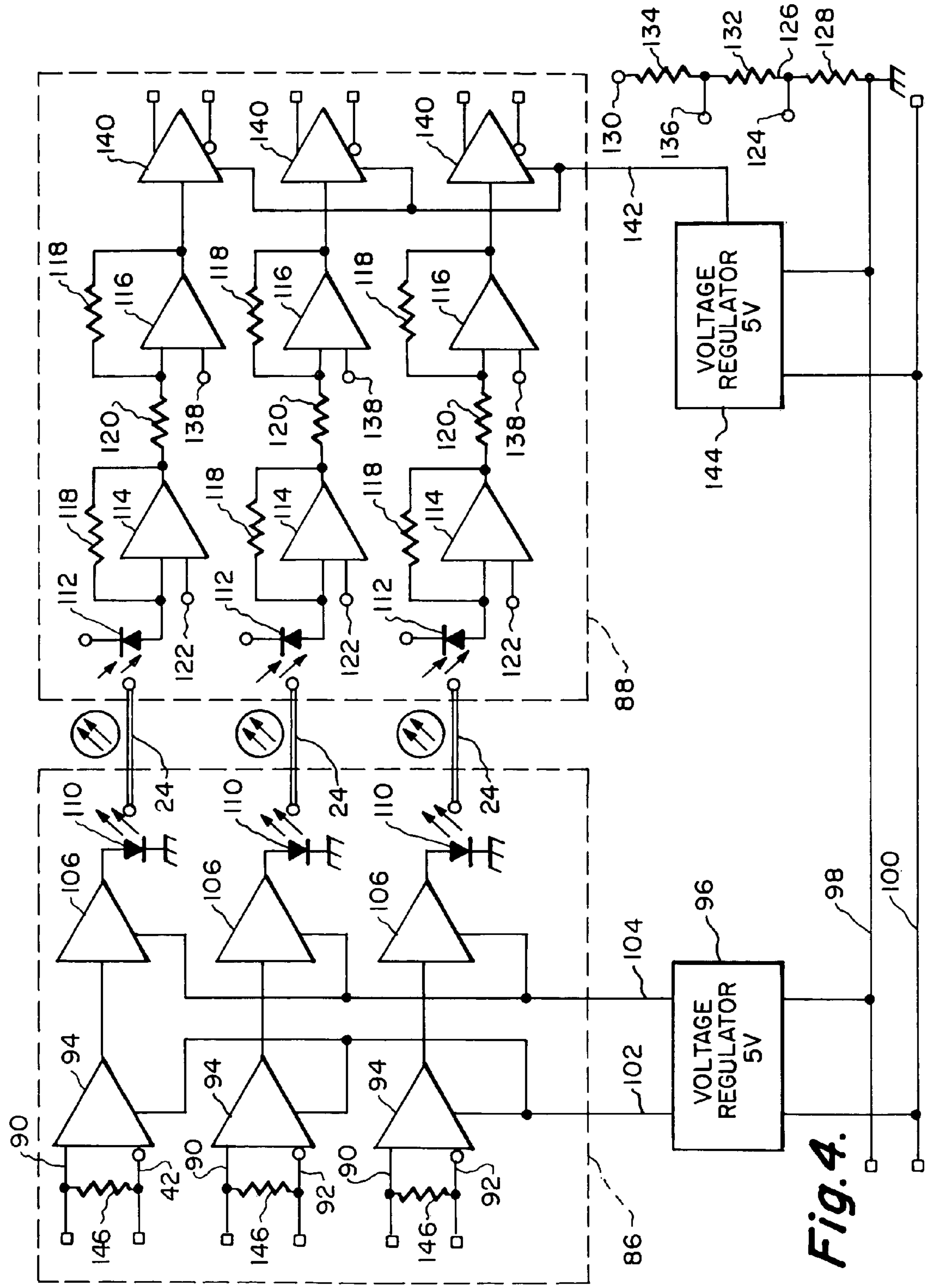
FIG. 4 is an electrical schematic for the communication cable of the present invention.

Referring particularly to FIG. 4, there is shown the electrical schematic for the communication cable 10 of this invention. The transmitting section is shown within dotted lines 86. The receiving section is shown within dotted lines 88. Within the transmitting section 86 are located a pair of lines 90 and 92 for each amplifier 94. There are three sets of lines 90 and 92 and there are three of the amplifiers 94 with each set of lines 90 and 92 to connect with one of the optical fibers 24. Each amplifier 94 is to connect with one of the optical fibers 24. The amplifiers 94 function as a line receiver. Input electrical power is supplied from a source, which is not shown, from lines 98 and 100 and through a voltage regulator 96 to output lines 102 and 104 from the voltage regulator 96. The output lines 102 and 104 are to supply the typical plus five volt input power to each of the amplifiers 94 and 106.

The output of each amplifier 94 is to be supplied respectively to a separate transimpedance amplifier 106. Each transimpedance amplifier 106 is to receive input power from the line 104. The output of each transimpedance amplifier 106 is supplied to a light emitting diode (LED) 110. The light pulse from each light emitting diode 110 is to be conducted to a separate optical fiber 24.

The output from each of the optical fibers 24 is received by a photodiode 112 with it being understood that there is a separate photodiode 112 for each optical fiber 24. The photodiodes 112 will be contained within the short cylinders 50 of the receiving connector 34 with the LEDs 110 being contained within the short cylinders 50 of the transmitting connector 32. The output from the photodiodes 112 is transmitted to another transimpedance amplifier which is composed of a series arrangement of amplifiers 114 and 116. Associated with each of the amplifiers 114 and 116 is a feedback resistor 118. In between the amplifiers 114 and 116 is a resistor 120 setting the gain of amplifiers 116. The voltage that is supplied to contacts 122 of each amplifier 114 is from contact 124 of a bias voltage line 126. A resistor 128 connects the contact 124 to the ground line 98 creating a bias voltage. The input voltage of plus five to twelve volts is to be supplied to contact 130 of the biasing line 126.

In between resistors 132 and 134 of the biasing line 126 is a contact 136. The contact 136 is to be connected to contacts 138 that supplies a bias voltage into each of the amplifiers 116. Power to each of the amplifiers 140 of the line driver is supplied by line 142 which connects through voltage regulator 144 to the positive power line 98 and the ground line 100. The output from each of the line drivers 140 is an electrical signal that is basically a recreation of the electrical signal that is supplied between the lines 90 and 92. Separating the lines 90 and 92 are connected together by resistor 146 for line impedance matching.

This invention has been discussed with there being LEDs 110 within connector 32 and photodiodes 112 within connector 34. However, it is considered to be within the scope of this invention that the communication cable 10 could be constructed to be bidirectional. This could be obtained if instead of three LEDs 110 within connector 32 that one of two of the LEDs could be replaced with a photodiode similar to photodiode 112. The same would be true for connector 34 where one or two of the photodiodes 112 of connector 34 could be each replaced with an LED similar to LED 110. The cable 10 could then be used to not only send signals from a computer to a machine but also transmit feedback signals from the machine to the computer.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be added for the device described, but also a method claim is added to address the method of making the invention. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A communication cable comprising:

a transmitting connector;

a receiving connector;

an elongated flexible conductor integrated between said transmitting connector and said receiving connector, said elongated conductor including a fiber assembly comprising at least one optical fiber and a wire assembly comprising at least one metallic wire, said metallic wire to conduct electrical power, said optical fiber to conduct light pulses; and said transmitting connector including a first light emitting device connected to said optical fiber, said first light emitting device to receive an electrical signal and then convert said electrical signal into a corresponding light signal which is transmitted through said optical fiber to be reconverted back into an electrical signal by a first light receiving device at said receiving connector.

2. The communication cable as defined in claim 1 wherein:

said transmitting connector includes a first flexible printed circuit board, said receiving connector including a second flexible printed circuit board.

3. The communication cable as defined in claim 1 wherein:

said wire assembly comprising a plurality of spaced apart wires, said fiber assembly including a plurality of spaced apart optical fibers.

4. The communication cable as defined in claim 1 wherein:

said optical fiber being fixedly mounted within both said transmitting connector and said receiving connector whereby said cable can incur abuse in a harsh environment and not break or become inoperative and still be able to operate, said optical fiber being fixedly mounted by being mounted alongside a high tensile strength elongated member.

5. The communication cable as defined in claim 1 wherein:

said transmitting connector also including a second light receiving device, said receiving connector including a second light emitting device, said second light emitting device being connected through said fiber assembly to said second light receiving device.

6. A connector for a communication cable comprising:

a housing;

a light pulse receiver mounted within said housing, said light pulse receiver being connected to a flexible printed circuit board, said flexible printed circuit board being mounted within said housing;

a light source connected to said housing, said light source to supply a light pulse to said light pulse receiver; and an electrical signal output connector connected to said printed circuit board, said electrical signal output connector adapted to receive an electrical signal from said printed circuit board and transmit same to an external piece of equipment.

7. The connector as defined in claim 6 wherein:

said light source comprises a flexible cable.

8. The connector as defined in claim 7 wherein:

said cable includes a plurality of separate optical fibers and a plurality of separate electrical conducting wires.

9. The connector as defined in claim 8 wherein:

said cable being fixedly mounted to said housing so said light source is not capable of any movement relative to said housing which would result in non-transmission of said light pulse to said light pulse receiver.

10. The connector as defined in claim 6 wherein:

said housing also including a light pulse emitter.

11. A connector for a communication cable comprising:

a housing;

a light pulse emitter mounted within said housing, said light pulse emitter being connected to a flexible printed circuit board, said flexible printed circuit board being mounted within said housing;

a light pulse receiver connected to said housing, said light pulse receiver to receive a light pulse from said light pulse emitter and transmit same to an output path located exteriorly of said housing;

said output path comprising a flexible, elongated conductor; and said conductor is formed of a plurality of spaced apart optical fibers and a plurality of spaced apart electrical conducting wires.

12. The connector as defined in claim 11 wherein:

said optical fibers being fixedly mounted to said housing so said light pulse emitter is not capable of any movement relative to said housing which would result in non-transmission of said light pulse to said output path.

* * * * *